United States Patent [19]

Kusters et al.

[11] 3,845,534
[45] Nov. 5, 1974

[54] GROOVED ROLLER AND METHOD OF MAKING SAME

[75] Inventors: Eduard Kusters, Finkenweg 18, 415 Krefeld-Forstwald; Valentin Appenzeller, Kempen/Ndrh., both of Germany

[73] Assignee: said Kusters, by said Appenzeller

[22] Filed: May 31, 1973

[21] Appl. No.: 365,611

[30] Foreign Application Priority Data
June 6, 1972 Germany.............................. 2227356

[52] U.S. Cl. .................................. 29/130, 29/121 R
[51] Int. Cl. ............................................ B21b 31/08
[58] Field of Search...... 29/121 R, 121 A, 125, 130, 29/132

[56] References Cited
UNITED STATES PATENTS

| | | |
|---|---|---|
| 1,278,384 | 9/1918 | Reiff .............................. 29/125 UX |
| 1,671,522 | 5/1928 | Furbush ................................ 29/125 |
| 1,837,084 | 12/1931 | Vanatta ............................ 29/130 X |
| 2,181,798 | 11/1939 | Blackley .......................... 29/125 X |
| 3,198,694 | 8/1965 | Justus............................ 29/121 R X |
| 3,238,866 | 3/1966 | Strindlund ....................... 29/125 X |

Primary Examiner—Alfred R. Guest
Attorney, Agent, or Firm—Kenyon & Kenyon Reilly Carr & Chapin

[57] ABSTRACT

A grooved roller such as those used in the paper industry in which a plurality of grooved rings are heat shrunk onto a cylindrical core in a manner which provides ease of manufacture and avoid possibilities of premature contact of the outer rings with the cylindrical core.

16 Claims, 2 Drawing Figures

3,845,534

GROOVED ROLLER AND METHOD OF MAKING SAME

BACKGROUND OF THE INVENTION

This invention relates to rollers in general and more particularly to an improved roller of the type having a corrosionfree outer sleeve mounted to a cylindrical core.

Grooved rollers some of which may have a quite large working width are often used in processes such as those found in the paper industry where such rollers are used to remove moisture from paper, cardboard or the like. Because they come in contact with moisture, at least the outer surface of the roller must be made of a metal or alloy which will not corrode, suitable materials being stainless steel, chilled iron or the like. Because of the initial cost of the metal and because such metals are generally not easily workable, such rollers are quite expensive to manufacture. In order to reduce these costs, roller have been developed which comprise an inner cylindrical core of a conventional metal with a relatively thin outer sleeve or cladding of the corrosion resistant metal. Generally, the outer sleeve is manufactured in a single piece using a mold and a centrifugal casting process. This requires that a separate mold be provided for each different size roller. Even though rolls of the same diameter are being manufactured, each one of different length requires a separate mold.

Typically the sleeve is heated and then slipped over the central core and secured in place through heat shrinking. Because the rollers very often have an extremely long length, this heat shrinking process becomes quite difficult. The sleeve cannot be heated to too high a temperature because of the risk of uneven stresses and distortion and thus, at the level to which it is normally heated the remaining tolerance between the inner surface of the sleeve and the outer surface of the core is quite small. The result is that unless extreme care is taken while the sleeve is being placed on the core, premature contact of the sleeve and the core can occur resulting in a shrinking and hardening of the sleeve and core before the sleeve has been completely moved in place. Attempts have been made to overcome this problem by slightly tapering the sleeve and core so that a large clearance is present as the sleeve is first slipped over the core which clearance gradually decreases as they come to their final relative positions.

Because of the hardness of the outer sleeve, it is difficult to cut the necessary grooves therein and such a procedure may require considerable time. For example, times in excess of a month may be required to manufacture a sleeve for a very large roller. In addition, the manufacturing process requires the use of a very large machine.

SUMMARY OF THE INVENTION

The present invention provides an improved roller of the type described above and a method of manufacturing such a roller which avoids the above-noted problems. Instead of making the outer sleeve in a single piece, a plurality of shorter sections are formed. By doing so, a single mold may be used to form sections for rollers of different length, with the only difference from roller to roller being the number of sections which are placed on the inner core. In addition, because only a small sleeve is being placed on the core the likelihood of premature contact is greatly reduced. Further, the small size of the sleeve sections makes them more workable and thus the necessary grooves may be more readily cut therein. The cutting can also be done with a machine which is much smaller than those used to form prior art grooves and also permits cutting grooves which are perpendicular to the sleeve axis whereas in the prior art such grooves generally had to be cut in a spiral fashion.

To further avoid premature contact, the present invention discloses using one or more intermediate layers of sleeving between the outer sleeve of hardened material and the inner core. This allows the intermediate sleeves to be put in place just prior to placing a section of sleeve on the core and thus only the section close to the sleeve contact point will be built up to the extent where there is not a large tolerance between the sleeve and core.

DETAILED DESCRIPTION OF THE PREFERRED EMBODIMENT

Figure 1:
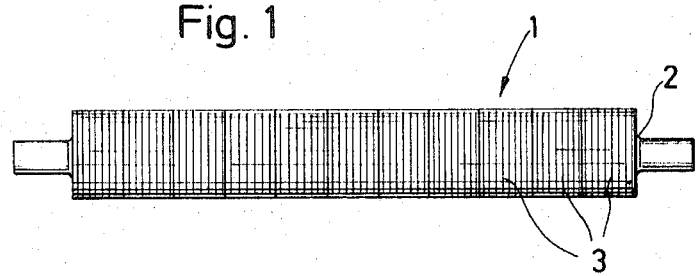
FIG. 1 is a plan view of a roller according to the present invention.

As shown by FIG. 1 the roller of the present invention, designated generally as 1 comprises a central cylindrical core 2 having ends formed so that it may be mounted in suitable bearing means in a paper processing machine or the like, and a plurality of grooved sleeves 3 which are heat shrunk onto the core 2 in a manner to be described below. The core 2 may be what is referred to as a controlled deflection roller.

Figure 2:
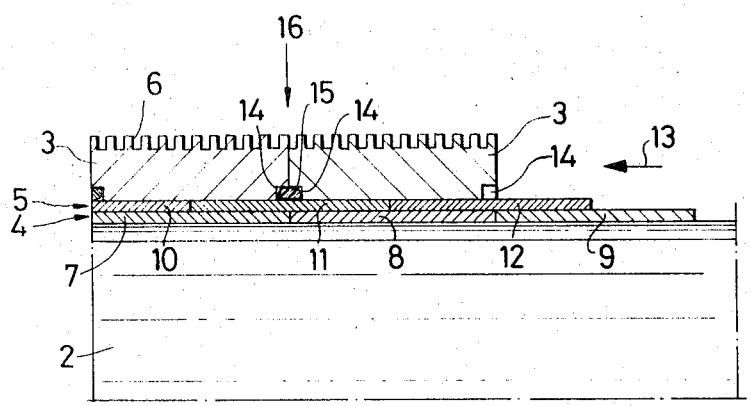
FIG. 2 is a cross-sectional view of a portion of the roller of FIG. 1.

FIG. 2 shows in cross-section a portion of the roller 1 of FIG. 1 and illustrates the manner in which the grooved sleeves 3 may be mounted to the core 2. In general, the completed roller comprises the inner core 2, a first layer of intermediate sleeves 4, a second layer of intermediate sleeves 5 and the outer grooved sleeves 3. The layers 4 and 5 will preferably be comprised of tin-plate sleeves which are thin enough so that when the corrosion-free outer ring 3 is heat shrunk around the layers 4 and 5 and the core 2, good solid contact will result. In constructing the completed roller, the intermediate sleeves 7 and 8 are first slid on the central core 2. Atop these two intermediate sleeves are placed the sleeves 10 and 11. The spacing of the two layers of sleeves is such that the junction points of the sleeves of layer 4 fall at the middle of a sleeve in layer 5. With these sleeves in place, the first outer sleeve 3 is heated and slid over the two layers to its proper position where it is allowed to shrink in place. Thereupon, the sleeve 9 of layer 4 and the sleeve 12 of layer 5 may be added. The second outer sleeve 3 is then heated and slid into place. Note that up until the time it approaches the area of the intermediate sleeve 12 it will have quite a large clearance between its inner surface and the outer surface of the central core. Thus, there is little danger of it prematurely contacting the core and being shrunk onto the core at the wrong place. Additional intermediate sleeves are then added in like manner and the rings 3 sequentially shrunk into place. Each of the rings 3 has at each end a grooved section 14 into which a seal 15 is inserted to prevent the moisture contacting the outer sleeve from seeping through and corroding the intermediate sleeves and the core. These seals 15 will be inserted between the insertion of rings 3, i.e., after the first ring 3 is in place, the seal 15 may be slipped on in the direction of arrow 13 and then the second ring 3 shrunk into place. Note also that the junctions of the sleeves 3 fall in the middle of the intermediate sleeves in layer 5 to maintain the structural integrity of the completed assembly.

It should also be pointed out that a single layer of intermediate sleeves may be used and that in some cases, no intermediate sleeves at all need be used. Significant advantages are still obtained since even though the large clearance is not maintained, the mounting of the outer sleeve on the inner core without premature contact is greatly facilitated by forming it into sections. Also, the tapered central core and tapered sleeves of the prior art may be used in conjunction with the present invention. Although this does not offer the advantage of using a single mold for all sleeve sections, it still materially reduces the length of sleeve which has an opportunity to contact the inner core.

Thus, an improved grooved roller and a method of making such a roller has been shown. Although a specific embodiment has been illustrated and described, it will be obvious to those skilled in the art that various modifications may be made without departing from the spirit of the invention which is intended to be limited solely by the appended claims.

What is claimed is:

1. A roller for use in the manufacture of paper, cardboard or the like, said roller having a working surface of a corrosion-free metal, comprising:
   a metal cylindrical core;
   a plurality of axially adjacent sleeves of a corrosion-free metal on the core; and
   at least one intermediate layer formed by a plurality of thin sleeves between said corrosion-free sleeves and said core, the edges of said thin sleeves and the edges of said corrosion-free sleeves being axially displaced from each other.

2. The invention according to claim 1 wherein said plurality of sleeves are heat shrunk onto said core.

3. The invention according to claim 2 wherein said sleeves are grooved.

4. The invention according to claim 2 wherein said corrosion-free metal is stainless steel.

5. The invention according to claim 2 wherein said corrosion-free metal is chilled iron.

6. The invention according to claim 1 wherein at least two intermediate layers of thin sleeves are placed between said core and said corrosion-free sleeves.

7. A roller for use in the manufacture of paper, cardboard or the like, said roller having a working surface of a corrosion-free metal, comprising:
   a metal cylindrical core;
   a plurality of axially adjacent sleeves of a corrosion-free metal on the core; and
   at least one intermediate layer formed by a plurality of thin sleeves between said corrosion-free sleeves and said core,
   said corrosion-free sleeves each containing an inside recess at each end and further including seals between each of said corrosion-free sleeves to prevent passage of moisture to said intermediate sleeves and said core.

8. The invention according to claim 7 wherein said plurality of sleeves are heat shrunk onto said core.

9. The invention according to claim 8 wherein said sleeves are grooved.

10. The invention according to claim 8 wherein said corrosion-free metal is stainless steel.

11. The invention according to claim 8 wherein said corrosion-free metal is chilled iron.

12. A roller for use in the manufacture of paper, cardboard or the like, said roller having a working surface of a corrosion-free metal, comprising:
    a metal cylindrical core; and
    a plurality of axially adjacent grooved sleeves of a corrosion-free metal heat shrunk onto the core.

13. The invention according to claim 12 wherein said corrosion-free metal is stainless steel.

14. The invention according to claim 12 wherein said corrosion-free metal is chilled iron.

15. The invention according to claim 12 and further including at least one intermediate layer formed by a plurality of thin sleeves between said corrosion-free sleeves and said core.

16. The invention according to claim 15 wherein at least two intermediate layers of thin sleeves are placed between said core and said corrosion-free sleeves.

* * * * *